United States Patent [19]

Cisco et al.

[11] 4,288,291

[45] Sep. 8, 1981

[54] RADIATION DETECTOR FOR USE IN NUCLEAR REACTORS

[75] Inventors: Terry C. Cisco, Glendale; Algert G. Grimaila, Northridge, both of Calif.

[73] Assignee: Whittaker Corporation, Burbank, Calif.

[21] Appl. No.: 38,200

[22] Filed: May 11, 1979

[51] Int. Cl.³ .................................................. G21C 17/00
[52] U.S. Cl. ........................................ 176/19 R; 250/390
[58] Field of Search ............... 176/19 R, 19 J, 19 EC; 250/390–392

[56] References Cited

U.S. PATENT DOCUMENTS

| | | | |
|---|---|---|---|
| 3,666,950 | 5/1972 | Ferber et al. | 250/390 |
| 3,751,333 | 8/1973 | Drummond et al. | 176/19 R |
| 3,854,048 | 12/1974 | Runge et al. | 250/390 |
| 3,879,612 | 4/1975 | Foster et al. | 250/390 |
| 4,140,911 | 2/1979 | Todt et al. | 250/390 |

Primary Examiner—S. A. Cangialosi
Attorney, Agent, or Firm—Spensley, Horn, Jubas & Lubitz

[57] ABSTRACT

A multi-sensor radiation detection system for removable insertion into a nuclear reactor wherein one conductor of all the sensors is a single, common element. This single common element is contained within a tubular metallic sheath and in cross-section comprises a multiple radial armed metallic conductor having a star shaped cross-section dimensioned to form wedge-shaped compartments throughout the active radiation detecting length of the metallic sheath.

8 Claims, 3 Drawing Figures

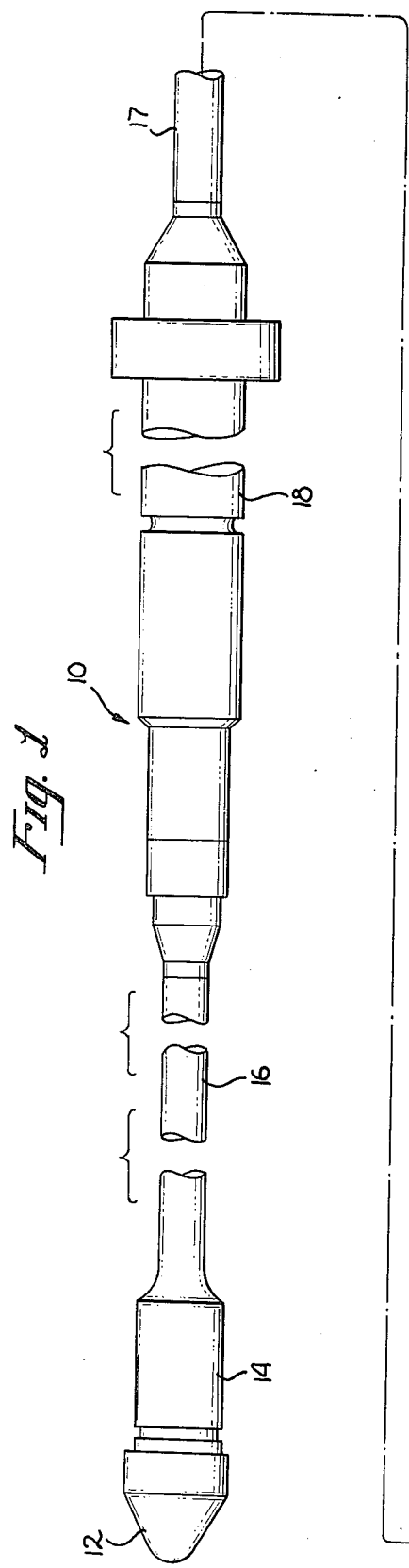
Fig. 1
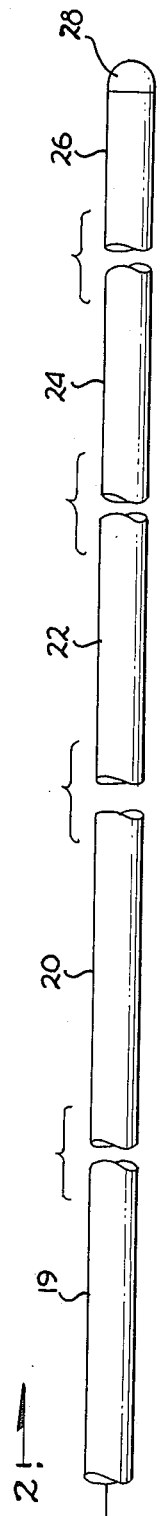
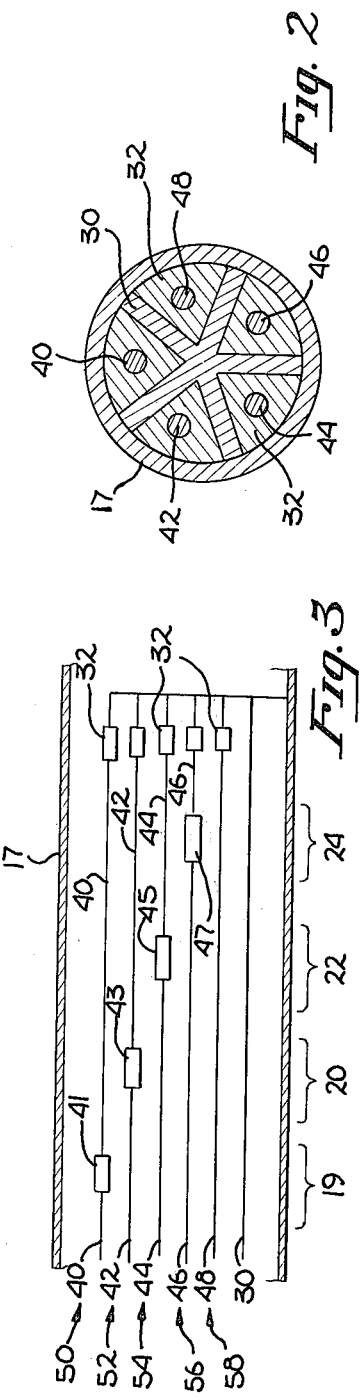
Fig. 2
Fig. 3

RADIATION DETECTOR FOR USE IN NUCLEAR REACTORS

BACKGROUND OF THE INVENTION

1. Field of the Invention

This invention relates to the construction of multisensor radiation detector systems designed for removable insertion into a nuclear flux region such as found in nuclear reactors. Such systems may be referred to as detector assemblies.

2. Description of the Prior Art

Radiation detection devices of various configurations which are intended for insertion and use within the core of a nuclear reactor are well known in the prior art. The various designs may be typified by those shown in the U.S. Pat. No. 4,087,693, to Brown, et al., issued May 2, 1978; the U.S. Pat. No. 3,879,612, to Foster, et al., issued Apr. 22, 1975; and the U.S. Pat. No. 3,375,370, to Hilborn, issued Mar. 26, 1968. The radiation detection devices illustrated in these various patents include the type known as self-powered detectors wherein external power is not required. In such a detector an emitter, a collector, and an insulator material between the two are used to generate an electric current which is indicative of the intensity of the radiation present at the location of the emitter element as detailed in the Russian publication titled "Energy Transformation of Short-Life Radio Active Isotopes", by M. G. Mitelman, R. S. Erofeev and N. D. Rosenbloom, 1960. The U.S. patent to Hilborn is relevant for its disclosure of a self-powered neutron detector assembly. The U.S. Patent to Foster, et al, is relevant for its disclosure of a multi-sensor radiation detector system. That patent shows the use of a self-powered detector in combination with what is referred to in that patent as a fission chamber. The detector and the fission chamber are connected electrically in parallel requiring but two conductors extending out of the reactor to an external electrical circuit. Switching means are employed to switch from the detector to the fission chamber. The U.S. Pat. No. 4,087,693 to Brown, et al., discloses the use of silicon dioxide as a dielectric for insulation of the emitter element.

While the various prior art radiation detection systems each has its particular advantages, typically all suffer from a common disadvantage resulting from its small diameter (typically 1/16 inch) and the long length of the detector. The typical radiation detector may range in length from 30 feet to over 100 feet. In order to insure accurate measurement of radiation levels, the manufacturing process must be carefully controlled. The detector element used in such detectors normally comprises a lead wire, which may be of a metal such as stainless steel, at the end of which is affixed an emitter element, typically of rhodium. The rhodium emitter and lead wire are insulated from an outer metallic conductor by a material which is typically aluminum oxide or magnesium oxide. The assembly comprising the central lead member, the emitter element, the insulating material and the outer metallic conductor is then swagged so as to compact the insulation material. The insulation is typically in the form of short cylinders of aluminum oxide or magnesium oxide slipped over the center wire and meant to be crushed around the wire during the swagging process. Since these cylinders are hard ceramics, the swagging can nick and break the lead member resulting in a high rejection ratio of sensors. The swagging and other steps in the production process may result in the central lead element and the rhodium emitter element deviating along their length from the center line of the outer conductor. This deviation from the center line may result in inaccuracies in measurements of radiation levels. Also such deviation from center would result in a different thickness of insulation material being present between the rhodium emitter element and the source of the radiation. As the thickness of the insulator material increases, the percentage of the charged particles emitted by the detector which is absorbed by the insulator material also increases. Charged particles so absorbed do not reach the outer conductor and thus are not measured. These inaccuracies in axial alignment of the emitter element can contribute to inaccuracy in measurement of radiation levels.

One method of assuring the centering of the center conductor and rhodium emitter element along the axis of the outer conductor element is that disclosed in U.S. Pat. No. 4,087,693. That method comprises the use of a silicon dioxide insulation which is initially in the form of a cloth or woven material which has been formed into a loose sock and placed over the emitter element and the lead wire. This assembly is then inserted into a length of metal tubing forming a sheath which is subsequently drawn through a sizing die. It is stated in that patent that at high levels of compaction the silicon dioxide fibers are easily broken since they are relatively brittle and the broken pieces move or flow with some preference for axial alignment as the outer sheath is drawn through a die. The fragmented insulation then flows easily around the lead wire and the rhodium emitter element and centers it along the length of the detector. This method would appear to be suitable for centering a single lead wire and rhodium element within a single outer conductor. However, such a method would not insure proper centering and alignment of multiple rhodium emitter elements and lead wires as well as proper spacing of the multiple detectors throughout the length of a long outer sheath.

In prior art detector systems the sensors are individually calibrated and then assembled into a multi-sensor detector; the individual sensors can not thereafter be calibrated. To insure accuracy of measurement, each sensor must be calibrated prior to assembly.

It is thus an object of the invention to provide an easily installed, high yield, relatively flexible device for assuring accurate and consistent location of an emitter with respect to the center line of an outer sheath along the full length of the active radiation detecting zone.

It is a further object of the invention to provide a multiple sensor detector system which accurately accounts for background radiation and does not require calibration of the sensors.

Another object of the invention is to provide enhanced reliability through the absence of nicks and fractures of the emitters and lead wires.

SUMMARY OF THE INVENTION

The present invention comprises a multi-sensor radiation detector system wherein the alignment and spacing of the plurality of detectors is insured by the use of a common conductor for each of the sensors. The common conductor has a star-shaped cross-section configuration. This star-shaped common conductor element divides the entire active radiation detecting zone of the detector assembly, wherein the sensors are located, into five wedge-shaped sections. The multi-sensor detector is constructed by first providing an emitter element such as a length of rhodium wire. To each end of the rhodium emitter wire is suitably affixed a central lead wire which may be Inconel, nickel, stainless steel, or other suitable metal. Over this combination is extruded an envelope of silicon dioxide insulation. These assemblies are then fitted into the wedge-shaped compartments of the star-shaped common conductor element. Since the star-shaped common conductor element is preformed to divide the interior of the stainless steel outer sheath into equal portions, the axial location and centering of each of the sensors (lead wire plus emitter element) is accurately established and assured. In such an assembly having five wedge-shaped segments, four of the segments contain a lead wire plus emitter element and the fifth contains a lead wire of the same material as all other lead wires (no emitter element) to provide a measurement of background radiation. Each of the four sensors has its emitter element located at a different position along the length of the detector assembly system. This provides for simultaneously detecting and measuring the radiation at four different locations within the core of the reactor.

This assembly is then fitted into the sheath of the final detector assembly and lightly swagged to form the sheath such that it is in contact with the star-shaped common conductor. The parts are sized such that the silicon dioxide insulation is only lightly compacted so as not to distort the emitters and lead wires.

By use of a common conductor element, such as the star-shaped element shown herein, and the lack of any distortion of the emitter in combination with one of the five sensors actually being a background sensor, the four remaining sensor elements can provide accurate measurements even after assembly into the final configuration of the present invention without calibration. The magnitude of the background radiation is subtracted from the magnitude of the radiation indicated by each separate sensor.

The common conductor also effectively shields each detector and its lead wires from the charged particles emitted from its neighboring detectors. (The detectors are emitters when subjected to nuclear radiation.) In this way cross-talk is minimized.

BRIEF DESCRIPTION OF THE DRAWINGS

FIG. 1 is an external view of a reactor radiation detector which has been lengthwise foreshortened so as to enable its depiction in the drawing.

FIG. 2 is a cross-section of such a detector assembly, constructed according to the teaching of the present invention.

FIG. 3 is an electrical schematic of the detector.

DESCRIPTION OF THE PREFERRED EMBODIMENT

The multi-sensor detector assembly 10 shown in FIG. 1 will typically comprise a dust cap 12, a connector adapter 14, and a first section of sheathing 16 connected to a seal plug 18 which is itself connected to a second sheathing portion 17. The second sheathing portion 17 may further be divided into five sections for purposes of the present invention as shown in FIG. 1 as sections 19, 20, 22, 24 and 26. These five sections are used to visually indicate that for each of the five sensors, the actual sensing portion (41, 43, 45 or 47), that is, the rhodium emitter portion of the sensor, is located at a different lengthwise position along the second sheathing portion 17. For example, a first emitter element 41 may be located in section 19, the emitter element 43 of the second sensor 52 assembly may be located lengthwise in section 20, the actual emitter element 45 of the third sensor assembly may be located within the section 22 and so forth. Each emitter element is approximately 15 inches long and of the same diameter as the lead wire. In the preferred embodiment, the background detector which consists of a length of wire (of the same diameter and material as all other lead wires) only (i.e., it has no rhodium emitter) is located in the section 26. In this manner, the level of radiation may be monitored at various positions within the core of the reactor. The background sensor 48 is used to detect the background level of radiation as averaged over the length of the background sensor element shown as 48 in FIG. 2. At the end of the second sheathing portion 17, or at the end of section 26 and forming the end of the multi-sensor detector assembly, there is a nose portion 28. This portion is suitably shaped and contoured so that it will not easily snag on any of the internal walls of the path used to guide the detector assembly through the reactor.

FIG. 2 shows the cross-section as appears in the detector section 19 of FIG. 1. The sheathing 17 is shown to enclose the star-shaped common conductor 30 of the various sensor assemblies. This common conductor 30 may be made of stainless steel. The thickness of the common conductor 30 is carefully chosen such that it is thick enough to shield the sensors from one another (i.e., minimize cross talk) and yet thin enough to permit the detector assembly to negotiate the tight turns in the paths provided in nuclear reactors. This star-shaped common conductor divides the interior of the sheathing portion 17 into five equally sized wedge-shaped compartments which are each filled with a silicon dioxide insulator designated 32. The silicon dioxide is provided in the form of a slurry and is extruded over the sensors and fitted into the wedge-shaped sections. A vacuum pump and heat is used to remove moisture from the assembly.

Within each of the five wedge-shaped sections there is located a sensor assembly, and the lead wires as indicated at 40, 42, 44 46, or 48. The cross-section as shown in FIG. 2 will change along the length of the sheath 17 to reflect the presence of the rhodium emitter element at the particular section where the cross-section may be taken. Thus, as shown in FIG. 1, the cross-section which comprises FIG. 2 has been taken at the portion of the section 19 wherein the rhodium emitter element is attached to the lead wire 40. The remaining lead wires 42, 44, and 46, as shown in FIG. 2, are comprised of a suitable conductive material such as nickel, Inconel or stainless steel. The final sensor assembly is the background sensor 58 and it is comprised of a wire 48 of the same material as the rhodium lead wires along its full length, and thus will appear the same regardless of the position at which the cross-sectional view is taken. If the cross-sectional view corresponding to the view of FIG. 2 were taken in the section labeled detector section number 22, then the sensor assembly number 54 would at that point be comprised of rhodium rather than the stainless steel or Inconel as shown in FIG. 2. It should be noted with particularity that the five sensors comprise the sensor assemblies 50, 52, 54, 56 and 58, each of which is located within a dielectric 32 and separated from its conducting element 30, which conducting element is common to each of the sensor assemblies 50 through 58. Because of the shape of the common conductor 30 and the extrusion method of manufacture, the multiple sensor assemblies are all held in proper parallel axial alignment throughout the active detecting length of the multi-sensor detector assembly 10.

The relative location of the various rhodium emitters is schematically illustrated in FIG. 3. The exterior sheath 17 houses five detector assemblies 50, 52, 54, 56 and 58, four of which comprise a pair of lead wires (40, 42, 44 and 46 respectively) and an emitter element (41, 43, 45 and 47 respectively); the fifth detector 58 comprising the background detector lead wire 48. In order to facilitate extrusion of the silicon dioxide dielectric over the lead wire and rhodium emitter, the outer diameter of the lead wire and rhodium emitter are identical. Each respective rhodium emitter element is disposed at a different distance along the length of the overall lance assembly 10. In this manner the radiation level may be monitored at different locations within the reactor. Each sensor assembly, including the background detector, is connected to a common conductor element 30, through the dielectric insulator element 32.

Although the present invention has been described with reference to the particular embodiment best illustrated by FIGS. 2 and 3, it is to be expressly understood that various modification may be made to that device by those having ordinary skill in the art without departing from the intended spirit and scope of the invention. For example, it should be obvious that instead of using a common center conductor to divide the interior of the sheath into five portions, a suitably shaped conductor could be used to divide the interior of the sheath into a greater or lesser number of compartments as desired. Also the detector assembly may be constructed of any suitable materials and the detectors themselves may be constructed of any material that emits sufficient charged particles under the influence of nuclear radiation. The present invention is only to be viewed as limited by the attached claims and not limited to the specific embodiments discussed herein.

There has thus been provided a multi-sensor detector assembly wherein all of the detector assemblies use a common conductor element which serves to divide the multi-sensor detector assembly into a plurality of equally spaced and properly aligned wedge-shaped compartments so as to maintain the sensor assemblies in proper co-axial and parallel alignment throughout the length of the active radiation detecting zone of the detector assembly. The common conductor also serves to shield each detector against the emissions of its neighbors thus minimizing cross talk among the detectors of the assembly.

We claim:

1. A multiple sensor radiation detection device for insertion into a nuclear reactor comprising:

an outer tubular sheath member;
an electrically conducting member having a crosssection comprised of a plurality of radially extending arms joined at their center, said conducting member having a crosssectional diameter substantially equal to the inner diameter of said sheath;
said electrically conducting member being inserted into said sheath member so as to divide the interior volume of said sheath member into a plurality of volumes having a generally wedge-shaped cross-section extending axially long said sheath; and
at least two radiation sensors each of which is located within a respective one of said volumes of wedge-shaped cross-section and spaced from said electrically conducting member by a dielectric whereby said electrically conducting member is a common conducting member for each radiation sensor.

2. A multiple sensor radiation detection device according to claim 1 wherein one of said plurality of radiation sensors is a background sensor comprised of a lead wire and the remainder of said radiation sensors comprise a lead wire and an emitter element inserted intermediate the ends of the lead wire, each such emitter element being located at a different distance from the end of said detection device within the outer tubular sheath.

3. A multiple sensor radiation detection device according to claim 2 wherein said electrically conducting member when inserted into said sheath member divides the interior volume of said sheath member into a plurality of equally sized wedge-shaped volumes.

4. A multiple sensor radiation detection device according to claim 3 wherein the number of said equally sized wedge-shaped volumes is five.

5. A multiple sensor radiation detection device according to claim 2 wherein said electrically conducting member is of stainless steel, the outer sheath is of stainless steel, the dielectric is silicon dioxide, and the emitter element is rhodium.

6. A multiple sensor radiation detector device according to claim 5 wherein said dielectric is applied to said sensors by an extrusion process and said sensors subsequently are inserted into said wedge-shaped volumes.

7. A multiple sensor radiation detector device according to claim 6 wherein said electrically conducting member is sufficiently thick to provide substantial electrical shielding and isolation of the radiation sensors from one another.

8. A multiple sensor radiation detector device according to claim 7 wherein the outer tubular sheath is impervious to liquid, thereby isolating the elements within the sheath from the reactor cooling liquid.

* * * * *